United States Patent
Gadelrab et al.

(10) Patent No.: US 9,864,647 B2
(45) Date of Patent: Jan. 9, 2018

(54) SYSTEM AND METHOD FOR DYNAMIC BANDWIDTH THROTTLING BASED ON DANGER SIGNALS MONITORED FROM ONE MORE ELEMENTS UTILIZING SHARED RESOURCES

(71) Applicant: QUALCOMM INCORPORATED, San Diego, CA (US)

(72) Inventors: Serag Gadelrab, Ontario (CA); Cristian Duroiu, San Diego, CA (US); Vinod Chamarty, San Diego, CA (US); Pooja Sinha, Ontario (CA); John Daniel Chaparro, Ontario (CA); Anil Vootukuru, San Diego, CA (US); Vinodh Ramesh Cuppu, Oceanside, CA (US); Joseph Schweiray Lee, San Diego, CA (US); Vinay Mitter, San Diego, CA (US); Paul Chow, Ontario (CA); Ruolong Liu, Ontario (CA); Johnny Jone Wai Kuan, Ontario (CA)

(73) Assignee: QUALCOM Incorporated, San Diego, CA (US)

( * ) Notice: Subject to any disclaimer, the term of this patent is extended or adjusted under 35 U.S.C. 154(b) by 211 days.

(21) Appl. No.: 14/588,798

(22) Filed: Jan. 2, 2015

(65) Prior Publication Data

US 2016/0117215 A1    Apr. 28, 2016

Related U.S. Application Data

(60) Provisional application No. 62/067,485, filed on Oct. 23, 2014.

(51) Int. Cl.
*G06F 11/07* (2006.01)
*G06F 1/08* (2006.01)
*G06F 13/40* (2006.01)

(52) U.S. Cl.
CPC ............ *G06F 11/0781* (2013.01); *G06F 1/08* (2013.01); *G06F 11/0742* (2013.01); *G06F 11/0793* (2013.01); *G06F 13/4022* (2013.01)

(58) Field of Classification Search
CPC .... G06F 1/08; G06F 11/0742; G06F 11/0793; G06F 13/4022
See application file for complete search history.

(56) References Cited

U.S. PATENT DOCUMENTS 6,499,072 B1 * 12/2002 Frank .................. G06F 13/4059
                                                    710/100
7,814,542 B1    10/2010 Day
                    (Continued)

OTHER PUBLICATIONS

International Search Report and Written Opinion—PCT/US2015/055829—ISA/EPO—dated Mar. 1, 2016.

*Primary Examiner* — Thomas Lee
*Assistant Examiner* — Gary Collins
(74) *Attorney, Agent, or Firm* — Smith Tempel Blaha LLC

(57) ABSTRACT

A method and system for adjusting bandwidth within a portable computing device based on danger signals monitored from one on more elements of the portable computing device are disclosed. A danger level of an unacceptable deadline miss ("UDM") element of the portable computing device may be determined with a danger level sensor within the UDM element. Next, a quality of service ("QoS") controller may adjust a magnitude for one or more danger levels received based on the UDM element type that generated the danger level and based on a potential fault condition type associated with the particular danger level. The danger levels received from one UDM element may be mapped to at least one of another UDM element and a non-UDM element. A quality of service policy for each (Continued)

UDM element and non-UDM element may be mapped in accordance with the danger levels.

23 Claims, 8 Drawing Sheets

(56) References Cited

U.S. PATENT DOCUMENTS

| | | |
|---|---|---|
| 8,249,141 B1 | 8/2012 | Harris et al. |
| 8,832,478 B2 | 9/2014 | Ananthakrishnan et al. |
| 2004/0019738 A1* | 1/2004 | Kahn ................. G06F 1/206 |
| | | 711/104 |
| 2005/0052438 A1 | 3/2005 | Shiuan et al. |
| 2005/0216643 A1* | 9/2005 | Munguia ............ G06F 1/3203 |
| | | 710/309 |
| 2006/0123169 A1* | 6/2006 | Chai ................. G06F 13/161 |
| | | 710/116 |
| 2009/0248927 A1* | 10/2009 | Hacking ............ G06F 1/3203 |
| | | 710/105 |
| 2010/0296520 A1 | 11/2010 | Matthews et al. |
| 2011/0072178 A1* | 3/2011 | Mace ................ G06F 13/161 |
| | | 710/244 |
| 2011/0179248 A1 | 7/2011 | Lee |
| 2012/0095607 A1* | 4/2012 | Wells ............... G06F 1/3203 |
| | | 700/291 |
| 2012/0272080 A1 | 10/2012 | Hou et al. |
| 2013/0080795 A1 | 3/2013 | Sistla et al. |
| 2014/0040453 A1 | 2/2014 | Vijayakumaran |
| 2014/0208141 A1 | 7/2014 | Bhandaru et al. |
| 2014/0240326 A1 | 8/2014 | Cutter et al. |
| 2015/0161070 A1 | 6/2015 | Duroiu et al. |
| 2015/0301576 A1* | 10/2015 | Dreps ............... G06F 1/324 |
| | | 713/322 |
| 2016/0127259 A1 | 5/2016 | Duroiu et al. |
| 2016/0350152 A1 | 12/2016 | Gadelrab et al. |

* cited by examiner

| Inputs | | | | | | | | Output – Core Policy |
|---|---|---|---|---|---|---|---|---|
| Danger levels from UDM block | | | Frequency Range defined by bottom and top frequencies | | | | MC Optimization ID. No. | OUTPUT – CORE POLICY |
| UDM #1 | ... | UDM #K | Interconnect #1 | ... | Interconnect #M | MC #1 | ... | MC #N | | |
| danger level | danger level | danger level | FreqA to FreqB | FreqA to FreqB | FreqA to FreqB | FreqA to FreqB | FreqA to FreqB | FreqA to FreqB | number | CORE POLICY #1 (225A) |
| danger level | danger level | danger level | FreqA to FreqB | FreqA to FreqB | FreqA to FreqB | FreqA to FreqB | FreqA to FreqB | FreqA to FreqB | number | CORE POLICY #2 (225B) |
| danger level | danger level | danger level | . | . | . | . | . | . | . | CORE POLICY #3 (225C) |
| danger level | danger level | danger level | . | . | . | . | . | . | . | CORE POLICY #X |
| danger level | danger level | danger level | . | . | . | . | . | . | . | CORE POLICY #Y |
| danger level | danger level | danger level | FreqA to FreqB | FreqA to FreqB | FreqA to FreqB | FreqA to FreqB | FreqA to FreqB | FreqA to FreqB | number | CORE POLICY #Z |
| N/A | N/A | N/A | N/A | N/A | N/A | N/A | N/A | N/A | N/A | zero |

| Danger Aggregate (502) | Inputs — Frequency Range defined by bottom and top frequencies (404) | | | Inputs — Frequency Range defined by bottom and top frequencies (405) | | | MC OPTIMIZATION ID. NO. (406) | OUTPUT – CORE POLICY (225) |
|---|---|---|---|---|---|---|---|---|
| | Interconnect #1 | ... | Interconnect #M | MC#1 | ... | MC#N | | |
| Aggregate Level | FreqA to FreqB | FreqA to FreqB | FreqA to FreqB | FreqA to FreqB | FreqA to FreqB | FreqA to FreqB | number | CORE POLICY #1 (225A) |
| Aggregate Level | FreqA to FreqB | FreqA to FreqB | FreqA to FreqB | FreqA to FreqB | FreqA to FreqB | FreqA to FreqB | number | CORE POLICY #2 (225B) |
| Aggregate Level | . | . | . | . | . | . | . | CORE POLICY #3 (225C) |
| Aggregate Level | . | . | . | . | . | . | . | CORE POLICY #X |
| Aggregate Level | . | . | . | . | . | . | . | CORE POLICY #Y |
| Aggregate Level | FreqA to FreqB | FreqA to FreqB | FreqA to FreqB | FreqA to FreqB | FreqA to FreqB | FreqA to FreqB | number | CORE POLICY #Z |
| N/A | N/A | N/A | N/A | N/A | N/A | N/A | N/A | zero |

| Inputs | | | | | | | | | | Output Frequency command | | | | |
|---|---|---|---|---|---|---|---|---|---|---|---|---|---|---|
| Danger levels from UDM block | | | Frequency Range defined by bottom and top frequencies | | | | | | MC OPTIMIZATION ID. NO. | | | | | |
| UDM #1 | ... | UDM #K | Interconnect #1 | ... | Interconnect #M | MC #1 | ... | MC #N | | Interconnect #1 | ... | Interconnect #M | MC #1 | ... | MC #N |
| danger level | danger level | danger level | Freq A to Freq B | Freq A to Freq B | Freq A to Freq B | Freq A to Freq B | Freq A to Freq B | Freq A to Freq B | number | freq | freq | freq | freq | freq | freq |
| danger level | danger level | danger level | Freq A to Freq B | Freq A to Freq B | Freq A to Freq B | Freq A to Freq B | Freq A to Freq B | Freq A to Freq B | number | freq | freq | freq | freq | freq | freq |
| . | . | . | . | . | . | . | . | . | . | . | . | . | . | . | . |
| . | . | . | . | . | . | . | . | . | . | . | . | . | . | . | . |
| . | . | . | . | . | . | . | . | . | . | . | . | . | . | . | . |
| danger level | danger level | danger level | Freq A to Freq B | Freq A to Freq B | Freq A to Freq B | Freq A to Freq B | Freq A to Freq B | Freq A to Freq B | number | freq | freq | freq | freq | freq | freq |
| N/A | N/A | N/A | N/A | N/A | N/A | N/A | N/A | N/A | N/A | no output command | no output command | no output command | no output command | no output command | no output command |

SYSTEM AND METHOD FOR DYNAMIC BANDWIDTH THROTTLING BASED ON DANGER SIGNALS MONITORED FROM ONE MORE ELEMENTS UTILIZING SHARED RESOURCES

PRIORITY AND RELATED APPLICATIONS STATEMENT

This application claims priority under 35 U.S.C. 119(e) to U.S. Provisional Application Ser. No. 62/067,485 filed on Oct. 23, 2014, entitled, "SYSTEM AND METHOD FOR DYNAMIC BANDWIDTH THROTTLING BASED ON DANGER SIGNALS MONITORED FROM ONE MORE ELEMENTS UTILIZING SHARED RESOURCES." The contents of which are hereby incorporated by reference.

DESCRIPTION OF THE RELATED ART

Portable computing devices ("PCDs") are powerful devices that are becoming necessities for people on personal and professional levels. Examples of PCDs may include cellular telephones, portable digital assistants ("PDAs"), portable game consoles, palmtop computers, and other portable electronic devices.

PCDs typically employ systems-on-chips ("SOCs"). Each SOC may contain multiple processing cores that have deadlines which, if missed, may cause detectable/visible failures that are not acceptable during operation of a PCD. Deadlines for hardware elements, such as cores, are usually driven by amount of bandwidth ("BW") a core receives from a shared resources, such as memory or buses, like dynamic random access memory ("DRAM"), Internal static random access memory ("SRAM") memory ("IMEM"), or other memory such as a Peripheral Component Interconnect Express ("PCI-e") external transport links over a short period of time. This short period of time depends on processing cores and is usually in the range of about 10 seconds to about 100 milliseconds.

When certain processing cores do not receive a required memory BW over specified period of time, failures may occur and which may be visible to the user. For example, take a display engine for a PCD: it reads data from a memory element (usually DRAM) and outputs data to a display panel/device for a user to view. If the display engine is not able to read enough data from DRAM within a fixed period of time, then such an issue may cause a display engine to "run out" of application data and be forced display a fixed, solid color (usually blue or black) on a display due to the lack of display data available to the display engine. This error condition is often referred to in the art as "Display Underflow" or "Display Under Run" or "Display tearing," as understood by one of ordinary skill in the art.

As another example of potential failures when a hardware element does not receive sufficient throughput or bandwidth from a memory element, a camera in a PCD may receive data from a sensor and write that data to the DRAM. If a sufficient amount of data is not written to DRAM within a fixed period of time, then this may cause the camera engine to lose input camera data. Such an error condition is often referred to in the art as "Camera overflow" or "Camera Image corruption," as understood by one of ordinary skill in the art.

Another example for potential failure is a modem core not being able to read/write enough data from/to DRAM over a fixed period to complete critical tasks. If critical tasks are not completed within deadline, modem firmware may crash: voice or data calls of a PCD are lost for period of time or an internet connection may appear sluggish (i.e.—stuttering during an internet connection).

Accordingly, there is a need in the art for bandwidth engineering, in the manner of shaping, throttling or other techniques based on danger signals monitored from one or more elements, such as cores, which may utilize shared resources in order to reduce and/or eliminate the error conditions noted above that are noticeable in a PCD, such as in a mobile phone.

SUMMARY OF THE DISCLOSURE

A method and system for adjusting bandwidth, though shaping and/or throttling, within a portable computing device based on danger signals monitored from one on more elements of the portable computing device are disclosed. A danger level of an unacceptable deadline miss ("UDM") element of the portable computing device may be determined with a danger level sensor within the UDM element. Next, a quality of service ("QoS") controller may adjust a magnitude for one or more danger levels received based on the UDM element type that generated the danger level and based on a potential fault condition type associated with the particular danger level.

The danger levels received from one UDM element may be mapped to at least one of another UDM element and a non-UDM element. A quality of service policy for each UDM element and non-UDM element may be mapped in accordance with the danger levels.

It may be determined by the QoS controller whether throttling/shaping bandwidth for at least one of a UDM element and a non-UDM element should be adjusted in accordance with the quality of service policy and based on the danger level signals. The QoS controller may also determine if frequency for one of an interconnect and a memory controller should be also be adjusted based on the detected danger level signals.

The QoS controller may also generate at least one QoS Policy signal for a memory controller in accordance with one or more danger level signals received from one or more UDM elements. Based on the memory controller Memory Controller QoS Policy signal produced by the QoS controller, each respective memory controller may determine if a memory controller policy should be adjusted.

An unacceptable deadline miss ("UDM") element may comprise, but is not limited to, at least one of a processing core, a display engine, a camera controller, a graphical processing unit, a modem, and software or firmware running on a programmable computing engine.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 4 is one exemplary embodiment of a look-up table for an individual throttle as illustrated in FIG. 1.

FIG. 5 is in other exemplary embodiment of a look-up table for an individual throttle as illustrated in FIG. 1.

FIG. 6 is one exemplary embodiment of a look-up table maintained by the quality of service (QoS) controller of FIG. 1 for managing interconnect and memory controller frequencies.

DETAILED DESCRIPTION

Figure 1:
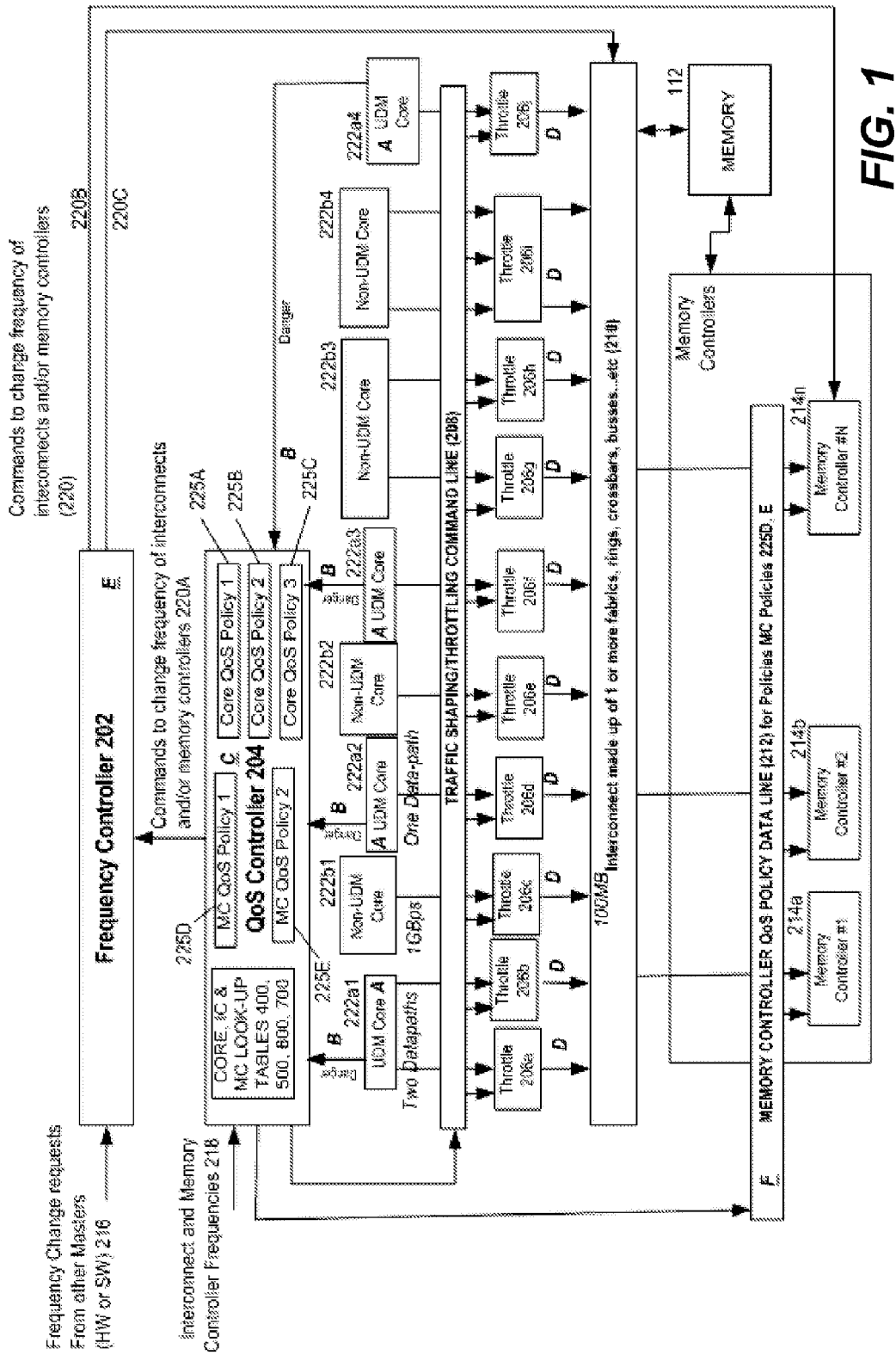
FIG. 1 is a functional block diagram of an exemplary system within a portable computing device (PCD) for bandwidth engineering/adjusting/shaping/throttling based on danger signals monitored from one or more unacceptable deadline miss ("UDM") elements, such as cores, which may utilize shared resources.

The word "exemplary" is used herein to mean serving as an example, instance, or illustration. Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," and "chip" are used interchangeably. Moreover, a CPU, DSP, or a chip may be comprised of one or more distinct processing components generally referred to herein as "core(s)."

In this description, the terms "workload," "process load" and "process workload" are used interchangeably and generally directed toward the processing burden, or percentage of processing burden, associated with a given processing component in a given embodiment. Further to that which is defined above, a "processing component" may be, but is not limited to, a central processing unit, a graphical processing unit, a core, a main core, a sub-core, a processing area, a hardware engine, etc. or any component residing within, or external to, an integrated circuit within a portable computing device.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, a notebook computer, an ultrabook computer, a tablet personal computer ("PC"), among others. Notably, however, even though exemplary embodiments of the solutions are described herein within the context of a PCD, the scope of the solutions are not limited to application in PCDs as they are defined above. For instance, it is envisioned that certain embodiments of the solutions may be suited for use in automotive applications. For an automotive-based implementation of a solution envisioned by this description, the automobile may be considered the "PCD" for that particular embodiment, as one of ordinary skill in the art would recognize. As such, the scope of the solutions is not limited in applicability to PCDs per se. As another example, the system described herein could be implemented in a typical portable computer, such as a laptop or notebook computer.

FIG. 1 is a functional block diagram of an exemplary system 101 within a portable computing device ("PCD") 100 (See FIG. 9) for bandwidth throttling based on danger signals monitored from one or more hardware elements, such as cores 222, which may utilize shared resources, like memory 112. The system 101 may comprise a quality of service ("QoS") controller 204 that is coupled to one or more unacceptable deadline miss ("UDM") elements, such as UDM cores 222a. Specifically, the QoS controller 204 may be coupled to four UDM cores 222a1, 222a2, 222a3, and 222a4.

In this disclosure, unacceptable deadline miss ("UDM") elements are those hardware and/or software elements which may cause significant or catastrophic failures of a PCD 100 as described in the background section listed above. Specifically, UDM elements 222 are those elements which may cause exemplary error conditions such as, but not limited to, "Display Underflows," "Display Under runs," "Display tearing," "Camera overflows," "Camera Image corruptions," dropped telephone calls, sluggish Internet connections, etc. as understood by one of ordinary skill in the art.

Any hardware and/or software element of a PCD 100 may be characterized and treated as a UDM element 222a. Each UDM element 222a, such as UDM cores 222a1-a4, may comprise a danger level sensor "A" which produces a danger level signal "B" that is received in monitored by the QoS controller 204. Further details of the danger level sensor A which produces danger level signals B will be described in further detail below in connection with FIG. 2.

Other hardware elements such as Non-UDM cores 222b1-b4 may be part of the PCD 100 and the system 101. The Non-UDM cores 222b1-b4 may not comprise or include danger level sensors A. Alternatively, in other exemplary embodiments, it is possible for Non-UDM cores 222b1-b4 to have danger level sensors A, however, these sensors A of these Non-UDM hardware elements 222b are either not coupled to the QoS controller 204 or a switch (not illustrated) has turned these danger level sensors A to an "off" position such that the QoS controller 204 does not receive any danger level signals B from these designated/assigned Non-UDM hardware elements 222b.

Each UDM-core 222a and Non-UDM core 222b may be coupled to a traffic shaper or traffic throttle 206. Each traffic shaper or traffic throttle 206 may be coupled to an interconnect 210. The interconnect 210 may comprise one or more switch fabrics, rings, crossbars, buses etc. as understood by one of ordinary skill in the art. The interconnect 210 may have additional elements, which are omitted for simplicity, such as controllers, buffers (caches), drivers, repeaters, and receivers, to enable communications. Further, the interconnect 210 may include address, control, and/or data connections to enable appropriate communications among its aforementioned components. The interconnect 210 may be coupled to one or more memory controllers 214. In alternative examples of the system 101, the traffic shaper or traffic throttle 206 may be integrated into the interconnect 210.

The memory controllers 214 may be coupled to memory 112. Memory 112 may comprise volatile or non-volatile memory. Memory 112 may include, but is not limited to, dynamic random access memory ("DRAM"), or internal static random access memory ("SRAM") memory ("IMEM"). The PCI controller 199 may be coupled to one or more PCI peripherals through a Peripheral Component Interconnect Express ("PCI-e") external transport link through the PCI peripheral port 198.

The QoS controller 204 may issue a command signals to individual traffic shapers or traffic throttles 206 via the throttle level command line 208. Similarly, the QoS controller 204 may issue memory controller QoS Policy signals to individual memory controllers 214 via a memory controller QoS Policy data line 212. The QoS controller 204 may also issue commands 220 to change frequency of the interconnect 210 as well as the memory controllers 220 via a frequency controller 202. The QoS controller 204 may monitor the danger level signals B generated by UDM elements 222a, such as, but not limited to, UDM cores 222a1-a4. The QoS controller 204 may also monitor interconnect and memory controller frequencies designated as input 218 in FIG. 1.

Meanwhile, the frequency controller 202 may issue frequency change commands to the interconnect 210 and the memory controllers 214 via command lines 220B and 220C. As its monitored input, the frequency controller 202 may receive frequency change requests 216 from Masters that include software, and/or hardware, such as from UDM cores 222a and Non-UDM cores 222b. As noted previously, the frequency controller 202 may also receive commands to change frequency for the interconnect 210 and or memory controllers 214 from the QoS controller 204.

As discussed above, as one of its inputs, the QoS controller 204 receives danger level signals B from each of the designated UDM hardware elements, such as UDM cores 222a. Each UDM hardware element has a danger level sensor A that produces the danger level signals B.

Danger level signals B may comprise information indicating levels or degrees at which a UDM hardware element believes that it is in danger of not meeting a deadline and/or it is in danger of a failure. The failure may comprise one or more error conditions described above in the background section for hardware devices such as, but not limited to, a display engine, a camera, and a modem.

Each danger level signal B may be unique relative to a respective hardware element. In other words, the danger level signal B produced by first UDM core 222a1 may be different relative to the danger level signal B produced by second UDM core 222a2. For example, the danger level signal B produced by the first UDM core 222a1 may have a magnitude or scale of five units while the danger level signal B produced by the second UDM core 222a2 may have a magnitude or scale of three units. The differences are not limited to magnitude or scale: other differences may exist for each unique UDM hardware element as understood by one of ordinary skill in the art. Each danger level signal B generally corresponds to a time-to-failure or probability of failure value.

The QoS controller 204 monitors the danger level signals B that are sent to it from the respective UDM hardware elements, such as the four UDM cores 222a1-222a4 as illustrated in FIG. 1. In addition to the danger level signals B being monitored, the QoS controller 204 also monitors the interconnect and memory controller frequencies as another input 218 as illustrated in FIG. 1. Based on the danger level signals B and the interconnect and memory controller frequencies 218, the QoS controller 204 determines if an appropriate QoS policy for each hardware element 222 being monitored, such as the four UDM cores 222a1-222a4 as well as the Non-UDM cores 222b1-b4 as illustrated in FIG. 1.

The QoS controller 204 maintains individual QoS policies 225 for each respective hardware element 222 which includes both UDM cores 222a1-a4 as well as Non-UDM cores 222b1-b4. While the individual QoS policies 225 have been illustrated in FIG. 1 as being contained within the QoS controller 204, it is possible that the QoS policy data for the policies 225 may reside within memory 112 which is accessed by the QoS controller 204. Alternatively, or in addition to, the QoS policies 225 for each hardware element 222 may be stored in local memory such as, but not limited to, a cache type memory (not illustrated) contained within the QoS controller 204. Other variations on where the QoS policies 225 may be stored are included within the scope of this disclosure as understood by one of ordinary skill in the art.

The QoS controller 204 may also maintain one or more Interconnect ("IC") and memory controller ("MC") frequency look-up tables 600. The one or more frequency look-up tables 600 are described in further detail below in connection with FIG. 6. The QoS controller 204 may use the frequency look-up tables 600 when it desires to issue frequency change commands 220A to the frequency controller 202 for adjusting the frequency of either the interconnect 210 or memory controllers 214 or both.

As apparent in FIG. 1, while the QoS controller 204 may be receiving danger level signals B only from UDM cores 222a1-222a4, the QoS controller 204 does monitor and control each hardware element to 222, which includes Non-UDM cores 222b1-b4 in addition to UDM cores 222a1-a4. The application of the QoS policy for each hardware element 222 being monitored is conveyed/relayed via the throttle level command line 208 to each respective throttle 206 which is assigned to a particular hardware element 222.

Each throttle 206 may comprise a hardware element that continuously receives throttle level commands from the traffic shaping/throttling level command line 208 that is managed by the QoS controller 204. Each traffic shaper or traffic throttle 206 adjusts incoming bandwidth from a respective core 222 to match the bandwidth level "D" specified by the QoS controller 204 via the throttle level command line 208. Each throttle 206 machine may be implemented with any or a combination of the following technologies: a discrete logic circuit(s) having logic gates for implementing logic functions upon data signals, an application specific integrated circuit ("ASIC") having appropriate combinational logic gates, one or more programmable gate array(s) ("PGA"), one or more field programmable gate array ("FPGA"), etc.

As stated previously, each hardware element 222 has a respective traffic shaper or traffic throttle 206 that is coupled to the traffic shaping/throttling level command line 208 which is under control of the QoS controller 204. This is but one important aspect of the system 101 in that the QoS controller 204 has control over each hardware element 222, not just the hardware elements 222 which may send or originate the danger level signals B.

Since the QoS controller 204 is in direct control of each hardware element 222, the QoS controller 204 may throttle the traffic or bandwidth of aggressor hardware elements 222, such as aggressor cores 222 which may or may not be UDM type hardware elements. By shaping/throttling bandwidth of aggressor hardware elements 222, such as Non-UDM cores 222*b*1-*b*4, then UDM cores 222*a*1-*a*4 may receive more bandwidth and/or lower latency from the system 101 thereby reducing respective danger levels of respective hardware elements 222, such as UDM cores 222*a*1-*a*4. This shaping/throttling of aggressor hardware elements 222, like Non-UDM hardware elements 222*b* by the QoS controller 204 may also prevent and/or avoid failures for the UDM hardware elements 222*a* as discussed above in the background section.

In addition to adjusting a shaping/throttle level for each hardware element 222 via a respective throttle 206, the QoS controller 204 may also determine an appropriate operating frequency "E" for each memory controller 214 as well as for the interconnect 210. By increasing the frequency of the interconnect 210 and/or one or more memory controllers 214, UDM hardware elements 222, such as UDM cores 222*a*1-*a*4, may receive more operating bandwidth and such action may also lower latency from the system 101 and thereby reduce respective danger level signals B for each of the UDM hardware elements 222*a*. The QoS controller 204 may decrease frequency once it determines that the one or more UDM hardware elements 222*a* are not in danger of failure. Such a decrease in frequency and a reduced overall power consumption of the system 101. Specifically, the QoS controller 204 may issue its frequency control commands to frequency controller 202 via a frequency command line 220A. The frequency controller 202 may in turn issue frequency change commands along the lines 220B, 220C to the interconnect 210 and the memory controllers 214.

The QoS controller 204 may also generate and issue memory controller QoS policy commands via the memory QoS policy data line 212 or "F" as illustrated in FIG. 1. This memory controller QoS policy data is determined by the QoS controller 204 based on the danger level signals B from UDM hardware elements 222 as well as interconnect and memory controller frequencies 218. When issuing a command to decrease the frequency, the QoS controller 204 may apply a hysteresis versus the frequency increase trigger point (that is, it may wait for the danger level to drop below the point that caused the frequency to increase), or may it insert a time-delay between the point it detects the possibility to reduce the frequency versus issuing the actual command in order to allow for a stable system that does not oscillate between two frequency settings as understood by one of ordinary skill in the art.

As understood by one of ordinary skill in the art, each memory controller 214 may have multiple efficiency optimization policies, such as DRAM efficiency optimization policies. All of these policies typically favor data traffic with higher priority over data traffic with lower priority. The delay between receiving high-priority transactions and interrupting an ongoing stream of low-priority transactions to the memory or DRAM 112 may be different for each policy.

For example, one memory controller efficiency optimization policy may have a short time for interrupting an ongoing lower-priority but high efficiency stream: this may be characterized as a lower DRAM efficiency policy. Another memory controller efficiency optimization policy may have a longer time for interrupting an ongoing lower-priority but high efficiency stream: this may be characterized as a higher DRAM efficiency policy.

For each memory controller 214, the QoS controller 203 may use the danger level Signal "B" to select a memory controller QoS policy that is transmitted to each memory controller 214 on the memory controller QoS policy data line 212 to select an appropriate memory controller efficiency optimization policy in order to avoid future risks of failure for UDM hardware elements 222. This selection of an appropriate memory controller efficiency optimization policy may be made using a look-up table 700 in which the danger level Signal "B" to the QoS controller 204 may be used as input.

In accordance with the look-up table 700, as the danger level Signals "B" to the QoS controller 204 increase, the QoS controller 204 may select a memory controller efficiency optimization policy 225D, E which may have a shorter time for interrupting an ongoing lower-priority data stream as understood by one of ordinary skill in the art. The selected memory controller QoS policy 225D, E is transmitted to the respective memory controller 214 on the Memory Controller QoS Policy Data Line 212.

Upon receipt of memory controller QOS Policy 225D,E from the QOS Controller 204 to one or more memory controllers 214 through the memory controller QOS policy level data line 212, each memory controller 214 may map the QOS Policy 225D,E to one or more internal QOS response mechanisms. Typically, memory controllers 214 have multiple knobs/adjustment mechanisms to manage efficiency tuning and latency control such as timer values, FIFO threshold values, arbitration methods, etc. as understood by one of ordinary skill in the art.

Further details of the look-up table 700 will be described below in connection with FIG. 7. While only one look-up table 700 is illustrated as shared among each memory controller 214, it is possible that each memory controller 214 has its own individual look-up table 700 tailored to the resources that a memory controller 214 is managing. Alternatively, in a shared table context, each memory controller 214 could be assigned to a specific portion of the look-up table 700 that is only accessed by a single memory controller 214.

In the exemplary embodiment of FIG. 1, the first UDM core 222a1 has two data paths that couple with the interconnect 210. Each data path from the first UDM core 222a1 may have its own respective traffic shaper/throttle 206, such as first traffic shaper/throttle 206a and second traffic shaper/throttle 206b.

In FIG. 1, as one example of traffic shaping/throttling for a potential Non-UDM aggressor core 222b1, the first Non-UDM aggressor core 222b1 may attempt to issue an aggregate bandwidth of one gigabyte per second ("GBps") in a series of requests to the interconnect 210. These successive requests are first received by the traffic shaper/throttle 206c. The traffic shaper/throttle 206c, under control of the QoS controller 204 and a respective core QoS policy 225B assigned to the Non-UDM core within the QoS controller, may "shape", "throttle" these series of requests such that the bandwidth presented to interconnect decreases from 1 GBps down to 100 megabyte bit per second ("MBps") so that one or more UDM cores 222a have more bandwidth for their respective memory requests via the interconnect 210.

Figure 2:
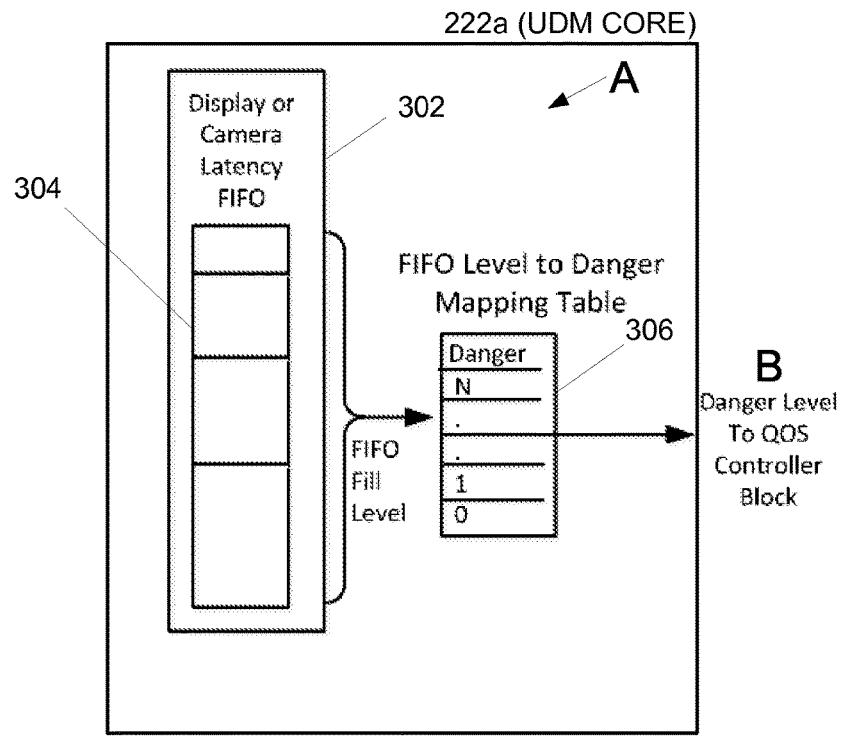
FIG. 2 is a functional block diagram of an exemplary danger level sensor for a unacceptable deadline miss ("UDM") hardware element, such as a core of a multicore processor.
Figure 9:
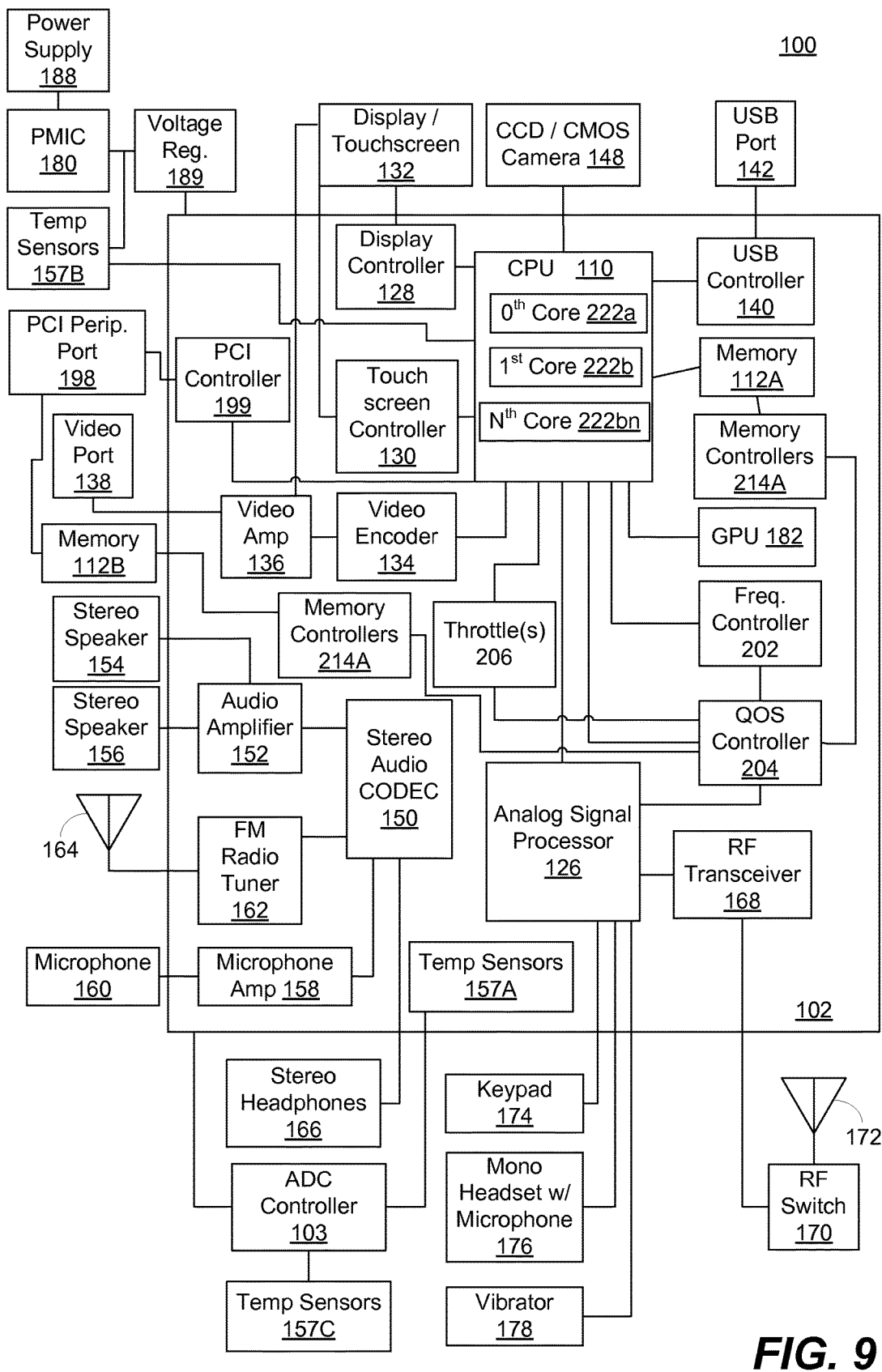
FIG. 9 is a functional block diagram of an exemplary, non-limiting aspect of a PCD in the form of a wireless telephone for implementing methods and systems for bandwidth throttling based on danger level signals monitored from one or more UDM elements.

Referring now to FIG. 2, this figure is a functional block diagram of an exemplary danger level sensor A for an unacceptable deadline miss ("UDM") hardware element 222, such as a display core 222a illustrated in FIG. 1 and in FIG. 9. The danger level sensor A may comprise a first-in, first-out (FIFO) data buffer 302 and a FIFO level danger mapping table 306. Each FIFO data buffer 302 may comprise a set of read and write pointers, storage and control logic. Storage may be static random access memory ("SRAM"), flip-flops, latches or any other suitable form of storage.

According to one exemplary embodiment, each FIFO data buffer 302 may track data that is received by the hardware element 222. For example, suppose that the hardware element 222 comprises a display engine. The display engine 222 or a display controller 128 (see FIG. 9) would read from DRAM memory 112 display data that would be stored in the FIFO data buffer 302. The display engine 222 (or display controller 128 of FIG. 9) would then take the display data from the FIFO dater buffer 302 and send it to a display or touchscreen 132 (see FIG. 9).

The FIFO data buffer 302 has a fill level 304 which may be tracked with a danger mapping table 306. As the fill level 304 for the FIFO data buffer 302 decreases in value, the danger level tracked by the danger mapping table 6 would increase because if the FIFO data buffer 302 becomes empty or does not have any data to send to the display or touchscreen 132, then the error conditions described above as the "Display Underflow" or "Display Under run" or "Display tearing," may occur. The output of the danger mapping table 306 is the danger level signal B that is sent to the QoS controller 204 as described above.

According to another exemplary embodiment, suppose the UDM hardware element 222a of FIG. 2 comprises a camera controller. The camera controller (not illustrated) within the SoC 102 reads data from the camera sensor 148 (See FIG. 9) and stores it within the FIFO data buffer 302. The camera controller then outputs the camera data from the FIFO data buffer 302 to DRAM memory 112. In this example embodiment, if the FIFO data buffer 302 overflows from the camera data, then some camera data may be lost and the error conditions of "Camera overflow" or "Camera Image corruption," may occur. So according to this exemplary embodiment, as the FIFO fill level 304 increases, then the danger level B also increases. This danger level of the camera sensor 148 is opposite to the danger level display embodiment described previously.

According to another exemplary embodiment, suppose the hardware element 222 of FIG. 2 comprises a modem or more analog signal processor 126 (see FIG. 9) or a graphical processing unit ("GPU") 182 (see FIG. 9). According to such embodiments, the core 222 may monitor the round-trip latency of all its transactions which are sent to the DRAM memory 112. The core 222 may calculate an average and/or peak round-trip DRAM latency over a fixed or a sliding time window. A danger level signal B may be generated in proportion to the average and/or peak latency observed by the core 222: for low latency transactions the danger level may be characterized as "low," while for transactions in which latency increases, the danger level may be characterized as "high."

According to other exemplary embodiments, the UDM element 222a of FIG. 2 and its respective danger level sensor A may comprise a software-based deadline projection module (not illustrated in FIG. 2). The software may be executed by a CPU 110 or a digital signal processor. Alternatively, the UDM element 222 may comprise firmware running on a programmable computing engine that continuously tracks the completion of tasks as well as fraction of tasks already completed and elapsed time since each task was commenced by UDM element 222. The software and/or firmware of the UDM element 222 may estimate the completion time for task and compares that completion time to a target or maximum deadline to complete one or more tasks as specified by a user and/or an application program.

According to this firmware/software exemplary embodiment for the UDM element 222a, the danger level signal B is determined and generated based on a look-up-table or a formula that uses one or more variables as input. Those one or more variables may include, but are not limited to, elapsed time, fraction of completed task, maximum deadline completion time, and/or concurrent total load on the computing engine.

According to another exemplary embodiment, the UDM element 222a may comprise a hardware element which has a deadline projection mechanism. For example, such a UDM element 222a may comprise a video encoder 134 (see FIG. 9) or a video codec. The video encoder 134 or video codec may comprise a fixed function computing engine that may continuously check fractions of tasks already completed as well as elapsed times since individual tasks have started. Such dedicated hardware may estimate completion time for each task in compared to a maximum deadline completion time that may be specified by a user and/or an application program. A video codec may comprise hardware that logs a percentage of video frames which are encoded or decoded any given time.

The danger level signal B for such a video oriented UDM element 222a would be determined in generated based on a table or formula that may use, but is not limited to, one or more of the following variables as input: elapsed time, fraction of completed task, maximum deadline for completion time, and the concurrent load on the fixed function engine.

Figure 3:
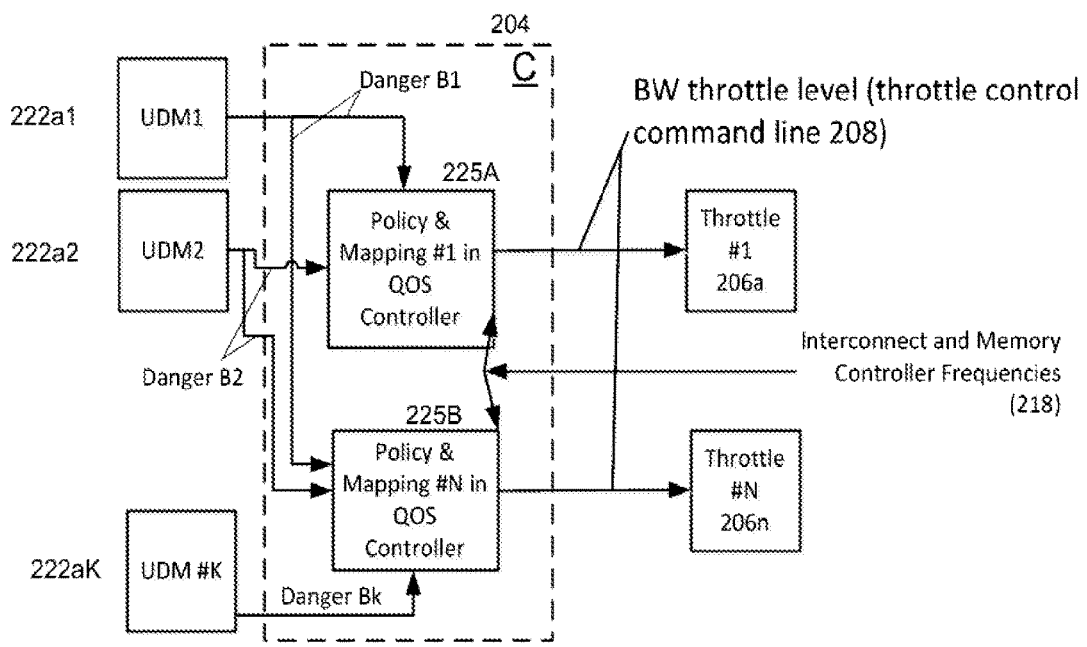
FIG. 3 is a functional block diagram illustrating further details of the quality of service (QoS) controller of FIG. 1.

Referring now to FIG. 3, this figure is a functional block diagram illustrating further details of the quality of service ("QoS") controller 204 of FIG. 1 and its functions. The QoS controller 204 may comprise a state machine. The state machine may be implemented with any or a combination of the following technologies: a discrete logic circuit(s) having logic gates for implementing logic functions upon data signals, an application specific integrated circuit ("ASIC") having appropriate combinational logic gates, one or more programmable gate array(s) ("PGA"), one or more field programmable gate array ("FPGA"), a microcontroller running firmware, etc.

As described above in connection with FIG. 1, the QoS controller 204 may receive danger level signals B from one or more UDM elements 222. Each danger level signal B may be re-mapped by the QoS controller 204 to a lower or higher level that may be set/established by an operator and/or manufacturer of the PCD 100.

For example, a danger level signal B from a display controller 128 having a magnitude of three units on a five-unit scale may be mapped/adjusted under an operator definition to a magnitude of five units, while a danger level of two units from a camera 148 may be mapped/adjusted under the operator definition to a magnitude of one unit. For this exemplary five-unit danger level scale, a magnitude of one unit may indicate a "least risk" of failure for a UDM element 222, while a magnitude of five units may indicate a "most certain/highest risk" of failure for a UDM element 222.

In this example, the operator definition may weight/shift the danger level signals B originating from the UDM element of a display controller 128 "more heavily" compared to the danger level signals B originating from the UDM element of a camera 148. That is, the danger level signals B from the display controller 128 are elevated to higher danger levels while the danger level signals B from the camera 148 may be decreased to lower danger levels. This means that an operator/manufacturer of PCD 100 may create definitions/scaling adjustments within the QoS controller 204 that increase the sensitivity for some UDM elements 222 while decreasing the sensitivity for other UDM elements. The operator definition/scaling adjustments which are a part of the mapping function performed by the QoS controller may be part of each policy 225 assigned to each UDM element 222 and a respective traffic shaper/throttle 206.

The QoS controller 204 may also monitor the frequencies 218 of both the memory controllers 214 and the interconnect 210. For each UDM core 222a and non-UDM core 222, the QoS Controller 204 may use remapped danger levels and frequencies of the interconnect 210 and/or the memory controllers 214 to compute through formula(s) or look-up table(s)] a QoS policy 225 for each core 222 and its traffic shaper/throttle 206 which produces throttle traffic shaper/throttle "D". Each policy 225 may specify interconnect frequency(ies) 220A or "E". The QoS policy 225 generated for each core 222 by the QoS controller may also include compute/dictate memory controller QoS Policy data "F" that is transmitted along the memory controller QoS Policy data line 212 that is received and used by the one or more memory controllers 214a-N for selecting one or more memory controller efficiency optimization policies.

As part of its mapping algorithm, danger level signals B from one UDM core 222 and/or one Non-UDM core 222b may not impact all other cores 222. The QoS controller 204 may have programmable mapping that is part of each policy 225 illustrated in FIG. 3 of which select UDM cores 222a may be designated to affect/impact other cores 222.

For example, danger level signals from a display controller 128 (see FIG. 9) designated as a UDM element 222 may cause bandwidth shaping/throttling to traffic from a GPU 182 (see FIG. 9) and a digital signal processor ("DSP") or analog signal processor 126 (see FIG. 9) but not the CPU 110 (see FIG. 9).

As another example, danger level signals B from camera 148 (see FIG. 9) may be programmed according to a policy 225 to impact a frequency of a memory controller 214 assigned and as well as the interconnect 210. Meanwhile, these danger level signals B from the camera 148 are not programmed to cause any impact on a DRAM optimization level. As a graphical example of mapping, see how danger level signal B1 of a first UDM core 222a1 is "mapped" to both the first policy 225A and the second policy 225B. Similarly, see how danger level signal B2 of a second UDM core 222a2 is "mapped" to both the second policy 225B and the first policy 225A. Also, see how the interconnect and memory controller frequencies 218 are also "mapped" to both policies 225A, 225B.

This mapping of danger level signals B from UDM elements 222 may be programmed to cause the QoS controller 204 to execute anyone or a combination of three of its functions: (i) cause the QoS controller 204 to issue commands to a respective bandwidth shaper/throttle 206 to shape or limit bandwidth of a UDM and/or Non-UDM element 222 (also referred to as output D in FIG. 1); (ii) cause the QoS controller 204 to issued commands 220A to the frequency controller 202 to change frequency of the interconnect 210 and/or one or more memory controllers (also referred to as output E in FIG. 1); and/or (iii) cause the QoS controller 204 to issue memory controller QoS Policy signals F to one or more memory controllers 214 indicating an appropriate memory controller policy in line with the danger level signals B (output F in FIG. 1).

Each QoS policy 225 may comprise a bandwidth shaping policy or throttle level for each shaper/throttle 206. A bandwidth shaping policy or throttle level is a value that a shaper/throttle 206 will not allow a particular UDM or Non-UDM element to exceed. The bandwidth throttle value may be characterized as a maximum threshold. However, it is possible in other exemplary embodiments that the bandwidth throttle value may also serve as a minimum value or threshold. In other embodiments, a shaper/throttle 206 could be assigned both minimum bandwidth as well as a maximum bandwidth as understood by one of ordinary skill in the art.

Each QoS Policy 225 maintained by the QoS controller 204 may be derived by one or more formulas or look-up tables which may map a number of active danger level signals and the danger level (value) of each signal at a given system frequency to the bandwidth throttle level for each core 222.

The QoS controller 204 may continuously convey the bandwidth shaping/throttling level that is part of each UDM and Non-UDM policy 225 to respective traffic shapers or traffic throttles 206 since these bandwidth levels may often change in value due to shifts danger level values and/or frequency. As noted previously, bandwidths of Non-UDM elements 222b, such as Non-UDM cores 222b1-b4 of FIG. 1 may be shaped/throttled since each Non-UDM element may have an assigned throttle 206 similar to each UDM element 222a. While in some operating conditions, a Non-UDM Core 222b may be an aggressor core relative to one or more UDM cores 222a, it is also possible for a UDM core 222a to be an aggressor relative to other UDM cores 222a. In all instances, the QoS controller 204 via the policy 225 derived for each core 222 may adjust the bandwidth throttle level of an aggressor core 222a1 or 222b1 via a respective throttle 206.

For example, a UDM core 222a for the display controller 128 (See FIG. 9) may be the aggressor with respect to bandwidth consumption relative to a UDM core 222a for the camera 148 under certain operating conditions. This means the QoS controller 204, according to a policy 225 assigned to the UDM core 222a for the display controller 128 may throttle the bandwidth of the display via a throttle 206 in order to give the UDM core 222*a* for the camera 148 as appropriate for specific operating conditions of the PCD 100.

FIG. 4 is one exemplary embodiment of a look-up table 400 for an individual shaper/throttle 206 as illustrated in FIG. 1. The look-up table 400 may be stored within internal memory (not illustrated) within the QoS Controller 204, such as in cache type memory. Alternatively, or additionally, the look-up table 400 could be stored in memory 112 that is accessible by the QoS Controller 204.

Each row in the look-up table 400 may comprise three inputs and one output. The three inputs are: (i) the Danger levels B (402) from all UDM elements 222*a* for which a row is applicable; (ii) the Interconnect (404) and memory controller frequency ranges (405) for which a row is applicable; and (iii) the memory controller optimization identification number for which this row 406 is applicable.

The output of each row in table 400 is the resulting QoS Policy 225 for this row. The QoS controller 204 continuously searches the inputs part of each row in the look-up table 400 for a row containing the entries 402 for the Danger levels B from all UDM elements 222*a* match the received Danger Levels B from the UDM elements 222*a*1-*a*4 AND the current, received interconnect and memory controller frequencies 218 match the ranges 404, 405 specified in the table AND the memory controller optimization identification numbers 406 match the current optimization policy identification for the memory controllers 214.

One exemplary row of table 400 is processed/used by the QoS controller 204 as follows: the QoS controller 204 selects the Core QoS policy in the intersection of a matching row with the Output Core QoS Policy Column 225.

This Core QoS Policy 225 represents the traffic shaping/throttling level for the traffic shaper/throttle represented by the look-up table 400. This selected QoS Policy 225 is conveyed by the QoS Controller 204 to the traffic shaper/throttle 206 though the traffic shaping/throttling command line 208. If none of the rows in the look-up table with danger level values 402 match the input danger levels "B", the input interconnect and memory controller frequencies 404, 405, and the current memory controller optimization policy 406, the QoS Controller 204 selects the last row where no QoS Policy 225 is enforced and the traffic shapers/throttles 206 are instructed not to interfere/throttle/shape the data form the cores 222. The exemplary table 400 shows one column 406 for memory controller Optimization identification number to apply for all memory controllers in the system, one of ordinary skill in the art recognizes that an alternative implementation of the system 100 could have individual policy optimizations for each memory controller 214.

The exemplary table 400 shows the frequency range as represented by an upper frequency and a lower frequency (Freq A to Freq B) but one of ordinary skill in the art recognizes that an alternative representation of the range is a starting frequency and a frequency offset that represents the frequency range above or below the starting frequency.

Referring now to FIG. 5, this figure is a look-up table 500 for an individual shaper/throttle 206 as illustrated in FIG. 1. The look-up table 500 may be stored within internal memory (not illustrated) within the QoS Controller 204, such as in cache type memory. Alternatively, or additionally, the look-up table 500, like table 400, could be stored in memory 112 that is accessible by the QoS Controller 204

While look-up table 400 of FIG. 4 uses every UDM Core danger level B as an input, look-up table 500 compared to table 400 replaces the individual UDMs Core danger levels with a calculated Danger Aggregate number/level/value 502 that represents the plurality of the UDM Core danger levels B. This would be done to preserve memory units in the SoC and/or to reduce the number of row entries that the QoS Controller 204 would need to match for monitored danger levels B.

One of ordinary skill in the art recognizes that there are multiple ways to derive a Danger Aggregate number/level/value 502 from the plurality of the UDM Core danger levels B such as summation of all the danger level values B of all UDM Core danger levels B or by counting the number of UDM Core danger levels B that are non-zero. When using a look-up table 500 of the form shown in FIG. 5, the QoS Controller 204 first computes the Danger Aggregate number 502 from the input UDM Core danger levels B and then proceeds to searching look-up table 500 in the same manner as described above for the look-up table 400 to arrive at the Core QoS Policy 225.

Referring now to FIG. 6, this figure is one exemplary embodiment of a look-up table 600 maintained by the quality of service (QoS) controller of FIG. 1 for managing interconnect and memory controller frequencies. The look-up table 600 may be stored within internal memory (not illustrated) within the QoS controller 204, such as in cache type memory. Alternatively, or additionally, the look-up table 600 could be stored in memory 112 that is accessible by the QoS controller 204.

Each row in a look-up table 600 is comprises at least three input groups and one output group. The three inputs are: (i) the Danger levels B (402A) from all UDM elements 222*a* for which a row is applicable; (ii) the Interconnect (404A) and memory controller frequency ranges (405A) for which a row is applicable; and (iii) the memory controller optimization identification number 406A for which a row is applicable. The output of each row is the resulting set of new interconnect (404B) and memory controller frequencies (406B) for this row.

The QoS controller 204 continuously searches the inputs part of each row in the look-up table 600 for a row containing the entries 402 for the Danger levels B from all UDM elements 222*a* match the received Danger Levels B from the UDM elements 222*a* AND the current interconnect and memory controller frequencies 218 match the ranges (404A, 405A) specified in the table AND the memory controller optimization identification numbers 406A match the current optimization policy identification for the memory controllers.

Once an exemplary a row is matched by the QoS controller 204, the QoS controller 204 selects the output set of frequency values in the intersection of that row with the Output Frequency Command Columns (404B, 405B). These new frequencies are conveyed to the interconnect 210 and memory controllers 214 via commands 220 via the operation of the Frequency Controller 202. If none of the rows in the look-up table 600 match the input danger levels "B" 402A, the input interconnect and memory controller frequencies 404A, 405A, and the current memory controller optimization policy 406A, the QoS Controller 204 selects the last row where no new commands are issued to the Frequency controller 201.

The exemplary table 600 shows the frequency ranges as represented by and upper frequency and a lower frequency (Freq A to Freq B) but one of ordinary skill in the art recognizes that an alternative representation of the range is a starting frequency and a frequency offset that represents the frequency range above or below the starting frequency. While look-up table 600 uses every UDM Core danger level B as an input, one of ordinary skill in the art may substitute the individual UDMs Core danger levels B with a calculated Danger Aggregate number, like column 502 of FIG. 5, that represents the plurality of the UDM Core danger levels B. This may be done to preserve memory units in the SoC 102 and/or to reduce the number of row entries that the QoS Controller 204 would need to match. One of ordinary skill in the art recognizes that there are multiple ways to derive Danger Aggregate number, like column 502 of FIG. 5, from the plurality of the UDM Core dangle levels B such as summation of all the danger level values of all UDM Core danger levels B or by counting the number of UDM Core danger levels B that are non-zero.

When using a look-up table of the form shown in FIG. 6 with Danger Aggregate input, the QoS Controller 204 may first compute the Danger Aggregate number from the input UDM Core danger levels B and then proceed to searching look-up table 600 in the same manner as applied to look-up table 400 to arrive at the new frequencies 404B, 405B for interconnects and memory controllers. When issuing a command to decrease the frequency, the QoS controller 204 may apply a hysteresis versus the frequency increase trigger point (that is it may wait for the danger level to drop below the point that caused the frequency to increase), or may insert a time-delay between the point it detects the possibility to reduce the frequency versus issuing the actual command in order to allow for a stable system 101 that does not oscillate between two frequency settings as understood by one of ordinary skill in the art.

Figure 7:
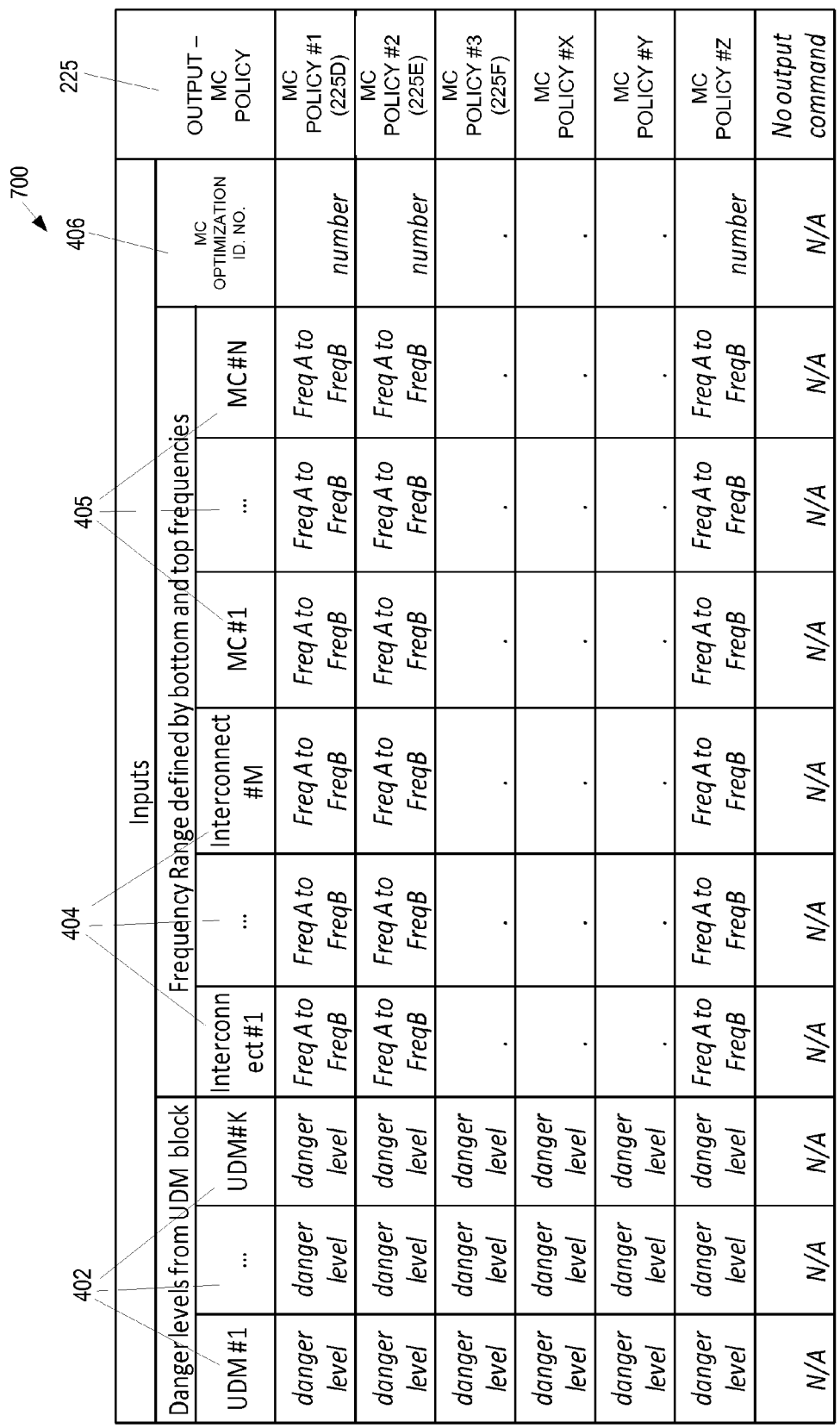
FIG. 7 is one exemplary embodiment of look-up table maintained by the QoS Contoller of FIG. 1 for selecting memory controller policies.

FIG. 7 is one exemplary embodiment of look-up table 700 maintained by QoS controller 204 of FIG. 1 for generating memory controller policies based on the danger level signals B in FIG. 1. The look-up table 700 may be stored within internal memory (not illustrated) within the memory controllers 214, such as in cache type memory. Alternatively, or additionally, the look-up table 700 could be stored in memory 112 that is accessible by respective look-up controllers 214.

Each row in a look-up table 700 is may comprise at least three inputs and one output. The three inputs are: (i) the Danger levels B (402) from all UDM elements 222a for which a row is applicable; (ii) the Interconnect (404) and memory controller frequency ranges (405) for which a row is applicable; and (iii) the memory controller optimization identification number (406) for which this row is applicable. The output of each row is the new memory controller policy 225D which is conveyed to the memory controllers through Memory Controller QoS Policy Data Line 212.

The QoS controller 204 continuously searches the inputs part of each row in the look-up table 700 for a row containing the entries (402) for the Danger levels B from all UDM elements 222a1-a4 match the received Danger Levels from the UDM Cores 222a1-a4 AND the current interconnect and memory controller frequencies 218 match the ranges (404, 405) specified in the table AND the memory controller optimization identification numbers 406 match the current optimization Policy identification for the memory controllers.

Once exemplary row of table 700 is used by the QoS controller 204 as follows: the QoS controller selects the output Memory Controller QoS Policy 225D at the intersection of that row with the Output Memory Controller Optimization identification number 406. The new memory controller QoS Policy 225D is transmitted to the memory controllers 214 through Memory Controller QoS Policy Data Line 212.

As noted above, upon receipt of memory controller QOS Policy 225D,E from the QOS Controller 204 to one or more memory controllers 214 through the memory controller QOS policy level data line 212, each memory controller 214 may map the QOS Policy 225D,E to one or more internal QOS response mechanisms. Typically, memory controllers 214 have multiple knobs/adjustment mechanisms to manage efficiency tuning and latency control such as timer values, FIFO threshold values, arbitration methods, etc. as understood by one of ordinary skill in the art If none of the rows 402 in the look-up table match 700 the input danger levels "B", the input interconnect and memory controller frequencies (404, 405), and the current memory controller optimization policy (406), the QoS Controller 204 selects the last row where no new commands are issued to the Memory Controller QoS Policy Data Line 212. While the exemplary table 700 shows one column 406 for input memory controller Optimization identification number that apply for all memory controllers 214 in the system 101, one of ordinary skill in the art recognizes that an alternative embodiment could have individual policy optimizations for each memory controller 214.

Alternatively, the exemplary table 700 shows one column 225D for output memory controller Optimization identification number that apply for each memory controller 214 in the system 101, one of ordinary skill in the art recognizes that an alternative implementation of the system 101 could have individual output policy optimizations 225D for each memory controller 214. Further, the exemplary table 700 shows the frequency ranges as represented by an upper frequency and a lower frequency (Freq A to Freq B) but one of ordinary skill in the art recognizes that an alternative representation of the range is a starting frequency and a frequency offset that represents the frequency range above or below the starting frequency. While look-up table 700 uses every UDM Core danger level B as an input, one of ordinary skill in the art recognizes that the individual UDMs Core danger levels B may be replaced with a calculated Danger Aggregate number that represents the plurality of the UDM Core danger levels B. This would be done to preserve memory units in the SoC 102 and/or to reduce the number of row entries that the QoS Controller 204 would need to match. One of ordinary skill in the art recognizes that there are multiple ways to derive Danger Aggregate number/level/value from the plurality of the UDM Core danger levels B such as summation of all the danger level values B of all UDM Core danger levels B or by counting the number of UDM Core danger levels that are non-zero. When using a look-up table 600 of the form shown in FIG. 6 with Danger Aggregate input levels 502, the QoS Controller 204 first computes the Danger Aggregate number 502 from the input UDM Core danger levels B and then proceeds to searching look-up table 700 in the same manner as described above for the other tables 400-600 to arrive at the new memory optimization ID command 225D.

Although the operation for the QoS Controller 204 has been described in terms of look-up tables 400, 500, 600 and 700, one of ordinary skill in the art recognizes that a look-up table is only one manner in associating input parameter(s) to output parameter(s): In addition to or as a substitute for look-up tables, formulas could be employed where the danger levels B are used along with user-defined coefficients to derive the core QoS Policies 225A-C, and the memory controller QoS policy 225D as well as the frequencies 220 for the interconnect 210 and memory controllers 214.

Figure 8:
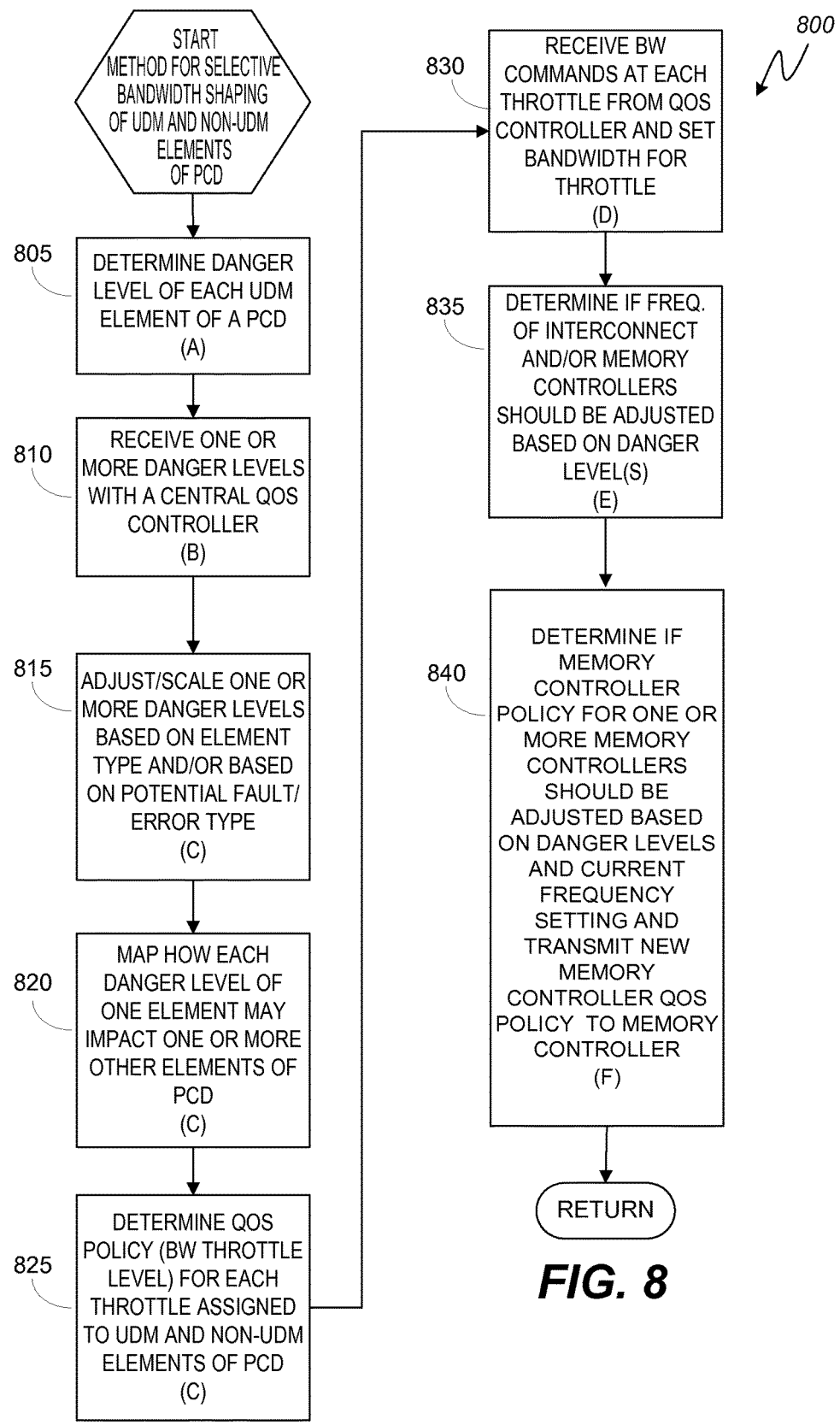
FIG. 8 is a logical flowchart illustrating an exemplary method for bandwidth adjusting/shaping/throttling based on danger level signals monitored for one or more UDM elements, such as cores of a SoC, which may utilize shared resources.

Referring now to FIG. 8, this figure is a logical flowchart illustrating an exemplary method 800 for bandwidth shaping/throttling based on danger level signals B monitored from one or more UDM elements 222, such as UDM cores 222a1-a4, which may utilize shared resources, like memory 112. When any of the logic of FIG. 8 used by the PCD 100 is implemented in software, it should be noted that such logic may be stored on any computer-readable medium for use by or in connection with any computer-related system or method. In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that may fetch the instructions from the instruction execution system, apparatus, or device and execute the instructions. In the context of this document, a "computer-readable medium" may be any means that can store, communicate, propagate, or transport the program for use by or in connection with the instruction execution system, apparatus, or device.

The computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include, but are not limited to, the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

Referring back to FIG. 8, block 805 is the first step of method 800. In block 805, a danger level for a unacceptable deadline miss ("UDM") element 222a, such as processing cores 222a-a4 illustrated in FIG. 1, are determined with a danger level sensor A. One exemplary embodiment of a danger level sensor A is illustrated in FIG. 2 as described above. As noted previously, a UDM element 222 may comprise hardware or software and similarly, the danger level sensor A (as referenced in FIGS. 1-2) may comprise hardware or software or a combination thereof.

Next, in block 810, one or more danger level signals B may be received with a quality of service ("QoS") controller 204 such as illustrated in FIG. 1. Subsequently, in block 815, the one or more danger level signals B may be adjusted/scaled with the QoS controller 204 based on the type of hardware and/or software which originates the danger level signal B and a relative risk of a data fault. This adjustment or scaling in block 815 was described above in connection with operator definitions where a magnitude of danger levels may be scaled upward or downward depending upon the type of hardware and/or software originating the danger level signal B.

Next, in block 820, the received one or more danger level signals from UDM elements 222a may be mapped to other UDM elements 222a as well as Non-UDM elements 222b. This mapping in block 820 as described above in connection with FIG. 3 which illustrates how danger level signals B may be mapped to other UDM elements 222a as well as Non-UDM elements 222b. The mapping in block 820 may become part of the QoS policy 225 determined by the QoS controller 204 for UDM elements 222a and Non-UDM elements. This mapping in block 820 generally corresponds with reference character "C" illustrated in FIG. 1 within the QoS controller 204.

Next, in block 825, the QoS controller 204 may determine a QoS policy for each throttle 206 assigned to UDM and Non-UDM elements 222. Each QoS policy 225 may comprise a bandwidth shaper/throttle level for each throttle 206. A bandwidth shaper/throttle is a value of bandwidth that a shaper/throttle 206 will not allow a particular UDM or Non-UDM element to exceed. The bandwidth throttle value may be characterized as a maximum threshold. However, it is possible in other exemplary embodiments that the bandwidth throttle value may also serve as a minimum value or threshold. In other embodiments, a throttle 206 could be assigned both minimum bandwidth throttle as well as a maximum bandwidth throttle as understood by one of ordinary skill in the art.

The QoS policy 225 for each throttle 206 is followed by the QoS controller 204 in order to issue commands to a respective shaper/throttle 206 along the throttle level command line 208. In block 830, each shaper/throttle 206 receives one or more commands from the QoS controller 204 along the throttle level command line 208. QoS Controller 204 may use a look-up table 400, 500 with the commands as input to determine the appropriate output bandwidth D (see "D" in FIG. 1) for the assigned UDM or Non-UDM element 222. Further details of how the look-up tables 400, 500 are used by the throttle 206 are described above in connection with FIGS. 4-5.

Next, in block 835, the QoS controller 204 may determine if the operating frequency of the interconnect 210 and/or the memory controller 214 should be adjusted based on the detected danger level signals received in block 810 and the present frequencies of interconnects 210 and memory controllers 214, as well as, the memory controller QoS policies 225D. If the QoS controller 140 determines that a frequency of either the interconnect 210 and/or one or memory controllers 214 needs adjustment, then the QoS controller 204 issues such frequency control commands 220A to the frequency controller 202 as designated by reference character "E" in FIG. 1.

In block 840, the QoS controller 204 may determine that the Optimization policy for one or more memory controllers 214 should be adjusted as a result of one or more danger levels using the look-up table 700. The QoS controller 204 in this block 840 may issue memory controller QoS Policy signals/data along the memory controller QoS Policy level data line 212 to a respective memory controller 214 which action is designated by reference character "F" in FIG. 1.

In a particular aspect, one or more of the method steps described herein, such as, but not limited to, those illustrated in FIG. 8, may be implemented by executable instructions and parameters stored in the memory 112. These instructions may be executed by the QoS controller 204, traffic shapers or traffic throttles 206, frequency controller 202, memory controller 214, CPU 110, the analog signal processor 126, or another processor, in addition to the ADC controller 103 to perform the methods described herein. Further, the controllers 202, 204, 214, the traffic shapers/throttles 206, the processors 110, 126, the memory 112, the instructions stored therein, or a combination thereof may serve as a means for performing one or more of the method steps described herein.

Referring now to FIG. 9, this figure is a functional block diagram of an exemplary, non-limiting aspect of a PCD 100 in the form of a wireless telephone for implementing methods and systems for bandwidth throttling based on danger level signals monitored from one or more UDM elements 222. As shown, the PCD 100 includes an on-chip system 102 that includes a multi-core central processing unit ("CPU") 110 and an analog signal processor 126 that are coupled together. The CPU 110 may comprise a zeroth core 222a, a first core 222b1, and an Nth core 222bn as understood by one of ordinary skill in the art.

As discussed above, cores 222a having the small letter "a" designation comprise unacceptable deadline miss ("UDM") cores. Meanwhile, cores 222b having a small letter "b" designation comprise Non-UDM cores as described above.

Instead of a CPU 110, a second digital signal processor ("DSP") may also be employed as understood by one of ordinary skill in the art. The PCD 100 has a quality of service ("QoS") controller 204 and a frequency controller 202 as described above in connection with FIG. 1.

In general, the QoS controller 204 is responsible for bandwidth throttling based on danger signals monitored from one or more hardware elements, such as the CPU 110 having cores 222 and the analog signal processor 126. As described above, the QoS controller 204 may issue commands to one or more traffic shapers or traffic throttles 206, the frequency controller 202, and one or more memory controllers 214A, B. The memory controllers 214A, B may manage and control memory 112A, 112B. Memory 112A may be located on-chip, on SOC 102, while memory 112B may be located off-chip, not on/within the SOC 102.

Each memory 112 may comprise volatile and/or non-volatile memory that resides inside SOC or outside SOC as described above. Memory 112 may include, but is not limited to, dynamic random access memory ("DRAM"), Internal static random access memory ("SRAM") memory ("IMEM"), or a Peripheral Component Interconnect Express ("PCI-e") external transport link. The memory 112 may comprise flash memory or a solid-state memory device. Although depicted as a single device, the memory 112 may be a distributed memory device with separate data stores coupled to the CPU 110, analog signal processor 126, and QoS controller 204.

The external, off-chip memory 112B may be coupled to a PCI peripheral port 198. The PCI peripheral port 198 may be coupled to and controlled by a PCI controller 199 which may reside on-chip, on the SOC 102.

As illustrated in FIG. 9, a display controller 128 and a touch screen controller 130 are coupled to the CPU 110. A touch screen display 132 external to the on-chip system 102 is coupled to the display controller 128 and the touch screen controller 130. The display 132 and display controller may work in conjunction with a graphical processing unit ("GPU") 182 for rendering graphics on display 132.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 9, a universal serial bus ("USB") controller 140 is coupled to the CPU 110. Also, a USB port 142 is coupled to the USB controller 140.

Further, as shown in FIG. 9, a digital camera 148 may be coupled to the CPU 110, and specifically to a UDM core 222a, such as UDM core 222a of FIG. 1. In an exemplary aspect, the digital camera 148 is a charge-coupled device ("CCD") camera or a complementary metal-oxide semiconductor ("CMOS") camera.

As further illustrated in FIG. 9, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 9 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 9 further indicates that a radio frequency ("RF") transceiver 168 may be coupled to the analog signal processor 126. An RF switch 170 may be coupled to the RF transceiver 168 and an RF antenna 172. As shown in FIG. 9, a keypad 174 may be coupled to the analog signal processor 126. Also, a mono headset with a microphone 176 may be coupled to the analog signal processor 126. Further, a vibrator device 178 may be coupled to the analog signal processor 126.

FIG. 9 also shows that a power supply 188, for example a battery, is coupled to the on-chip system 102 through a power management integrated circuit ("PMIC") 180. In a particular aspect, the power supply 188 may include a rechargeable DC battery or a DC power supply that is derived from an alternating current ("AC") to DC transformer that is connected to an AC power source. Power from the PMIC 180 is provided to the chip 102 via a voltage regulator 189 with which may be associated a peak current threshold.

The CPU 110 may also be coupled to one or more internal, on-chip thermal sensors 157A as well as one or more external, off-chip thermal sensors 157B-C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B-C may comprise one or more thermistors. The thermal sensors 157B-C may produce a voltage drop that is converted to digital signals with an analog-to-digital converter ("ADC") controller 103. However, other types of thermal sensors may be employed without departing from the scope of this disclosure.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157B-C are external to the on-chip system 102.

The CPU 110, as noted above, is a multiple-core processor having N core processors 222. That is, the CPU 110 includes a zeroth core 222a, a first core 222b1, and an $N^{th}$ core 222bn. As is known to one of ordinary skill in the art, each of the first zeroth core 222a, the first core 222b and the $N^{th}$ core 222bn are available for supporting a dedicated application or program. Alternatively, one or more applications or programs may be distributed for processing across two or more of the available cores 222.

The zeroth core 222*a*, the first core 222*b* and the N*th* core 222*bn* of the CPU 110 may be integrated on a single integrated circuit die, or they may be integrated or coupled on separate dies in a multiple-circuit package. Designers may couple the zeroth core 222*a*, the first core 222*b* and the N*th* core 222*bn* via one or more shared caches (not illustrated) and they may implement message or instruction passing via network topologies such as bus, ring, mesh and crossbar topologies.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

The various operations and/or methods described above may be performed by various hardware and/or software component(s) and/or module(s), and such component(s) and/or module(s) may provide the means to perform such operations and/or methods. Generally, where there are methods illustrated in Figures having corresponding counterpart means-plus-function Figures, the operation blocks correspond to means-plus-function blocks with similar numbering. For example, blocks 805 through 845 illustrated in FIG. 8 correspond to means-plus-functions that may be recited in the claims.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

The methods or systems, or portions of the system and methods, may be implemented in hardware or software. If implemented in hardware, the devices can include any, or a combination of, the following technologies, which are all well known in the art: discrete electronic components, an integrated circuit, an application-specific integrated circuit having appropriately configured semiconductor devices and resistive elements, etc. Any of these hardware devices, whether acting or alone, with other devices, or other components such as a memory may also form or comprise components or means for performing various operations or steps of the disclosed methods.

The software and data used in representing various elements can be stored in a memory and executed by a suitable instruction execution system (microprocessor). The software may comprise an ordered listing of executable instructions for implementing logical functions, and can be embodied in any "processor-readable medium" for use by or in connection with an instruction execution system, apparatus, or device, such as a single or multiple-core processor or processor-containing system. Such systems will generally access the instructions from the instruction execution system, apparatus, or device and execute the instructions.

Therefore, although selected aspects have been illustrated and described in detail, it will be understood that various substitutions and alterations may be made therein without departing from the spirit and scope of the present invention, as defined by the following claims.

What is claimed is:

1. A method for adjusting bandwidth within a portable computing device based on danger signals monitored from one or more elements of the portable computing device, the method comprising:
   determining a danger level of an unacceptable deadline miss element of the portable computing device based on at least one danger level signal sent from a danger level sensor associated with the unacceptable deadline miss element;
   adjusting a magnitude for the danger level signal based on the unacceptable deadline miss element type that generated the danger level signal;
   mapping danger level signals received from one unacceptable deadline miss element to at least one of another unacceptable deadline miss element and a non-unacceptable deadline miss element;
   determining at least one quality of service policy for one of an unacceptable deadline miss element and a non-unacceptable deadline miss element in accordance with the mapped danger level signals;
   determining if the bandwidth for at least one of an unacceptable deadline miss element and a non-unacceptable deadline miss element should be adjusted in accordance with the quality of service policy;
   issuing a command to adjust the bandwidth of at least one of an unacceptable deadline miss element and non-unacceptable deadline miss element; and in response to the command, adjusting the bandwidth of at least one of an unacceptable deadline miss element and non-unacceptable deadline miss element.

2. The method of claim 1, further comprising determining if the frequency for one of an interconnect and a memory controller associated with at least one of the unacceptable deadline miss elements should be adjusted.

3. The method of claim 1, further comprising generating at least one memory controller QoS Priority signal for a memory controller associated with at least one of the unacceptable deadline miss elements in accordance with one or more danger level signals received from one or more unacceptable deadline miss elements.

4. The method of claim 3, further comprising determining if a memory controller policy should be adjusted based on at least one of the memory controller frequency, interconnect frequency and existing memory controller QoS policy.

5. The method of claim 1, wherein an unacceptable deadline miss element comprises at least one of a processing core, a display engine, a camera controller, a graphical processing unit, a modem, and software or firmware running on a programmable computing engine.

6. The method of claim 1, further comprising generating a look-up table for determining how bandwidth should be shaped for at least one of the unacceptable deadline miss element and the non-unacceptable deadline miss element.

7. The method of claim 1, further comprising generating a look-up table for listing optional operating frequencies of at least one interconnect and at least one memory controller associated with at least one of the unacceptable deadline miss elements that correspond with the one or more danger level signals.

8. The method of claim 1, further comprising generating a look-up table for listing optional memory controller efficiency options that correspond with one or more memory controllers associated with at least one of the unacceptable deadline miss elements.

9. The method of claim 1, wherein the portable computing device comprises at least one of a mobile telephone, a personal digital assistant, a pager, a smartphone, a navigation device, and a hand-held computer with a wireless connection or link.

10. A system for adjusting bandwidth within a portable computing device based on danger signals monitored from one or more elements of the portable computing device, the system comprising:
a processor operable for:
determining a danger level of an unacceptable deadline miss element of the portable computing device based on at least one danger level signal sent from a danger level sensor associated with the unacceptable deadline miss element;
adjusting a magnitude for the danger level signal based on the unacceptable deadline miss element type that generated the danger level signal;
mapping danger level signals received from one unacceptable deadline miss element to at least one of another unacceptable deadline miss element and a non-unacceptable deadline miss element;
determining at least one quality of service policy for one of an unacceptable deadline miss element and a non-unacceptable deadline miss element in accordance with the mapped danger level signals;
determining if the bandwidth for at least one of an unacceptable deadline miss element and a non-unacceptable deadline miss element should be adjusted in accordance with the quality of service policy;
issuing a command to adjust the bandwidth of at least one of an unacceptable deadline miss element and non-unacceptable deadline miss element; and
in response to the command, adjusting the bandwidth of at least one of an unacceptable deadline miss element and non-unacceptable deadline miss element.

11. The system of claim 10, wherein the processor is further operable for determining if the frequency for one of an interconnect and a memory controller associated with at least one of the unacceptable deadline miss elements should be adjusted.

12. The system of claim 10, wherein the processor is further operable for generating at least one memory controller QoS Priority signal for a memory controller associated with at least one of the unacceptable deadline miss elements in accordance with one or more danger level signals received from one or more unacceptable deadline miss elements.

13. The system of claim 12, wherein the processor is further operable for determining if a memory controller policy should be adjusted based on at least one of the memory controller frequency, interconnect frequency and existing memory controller QoS policy.

14. The system of claim 10, wherein an unacceptable deadline miss element comprises at least one of a processing core, a display engine, a camera controller, a graphical processing unit, a modem, and software or firmware running on a programmable computing engine.

15. The system of claim 10, wherein the processor is further operable for generating a look-up table for determining how bandwidth should be shaped for at least one of the unacceptable deadline miss element and the non-unacceptable deadline miss element.

16. The system of claim 10, wherein the processor is further operable for generating a look-up table for listing optional operating frequencies of at least one interconnect and at least one memory controller associated with at least one of the unacceptable deadline miss elements that correspond with the one or more danger level signals.

17. The system of claim 10, wherein the processor is further operable for generating a look-up table for listing optional memory controller efficiency options that correspond with one or more memory controllers associated with at least one of the unacceptable deadline miss elements.

18. The system of claim 10, wherein the portable computing device comprises at least one of a mobile telephone, a personal digital assistant, a pager, a smartphone, a navigation device, and a hand-held computer with a wireless connection or link.

19. A system for adjusting bandwidth within a portable computing device based on danger signals monitored from one or more elements of the portable computing device, the system comprising:
means for determining a danger level of an unacceptable deadline miss element of the portable computing device based on at least one danger level signal sent from a danger level sensor associated with the unacceptable deadline miss element;
means for adjusting a magnitude for the danger level signal based on the unacceptable deadline miss element type that generated the danger level signal;
means for mapping danger level signals received from one unacceptable deadline miss element to at least one of another unacceptable deadline miss element and a non-unacceptable deadline miss element;

means for determining at least one quality of service policy for one of an unacceptable deadline miss element and a non-unacceptable deadline miss element in accordance with the mapped danger level signals;

means for determining if the bandwidth for at least one of an unacceptable deadline miss element and a non-unacceptable deadline miss element should be adjusted in accordance with the quality of service policy;

means for issuing a command to adjust the bandwidth of at least one of an unacceptable deadline miss element and non-unacceptable deadline miss element; and means for adjusting the bandwidth of at least one of an unacceptable deadline miss element and non-unacceptable deadline miss element in response to the command.

20. The system of claim 19, further comprising means for determining if the frequency for one of an interconnect and a memory controller associated with at least one of the unacceptable deadline miss elements should be adjusted.

21. The system of claim 19, further comprising means for generating at least one memory controller QoS Priority signal for a memory controller associated with at least one of the unacceptable deadline miss elements in accordance with one or more danger level signals received from one or more unacceptable deadline miss elements.

22. The system of claim 19, further comprising means for determining if a memory controller policy should be adjusted based on at least one of the memory controller frequency, interconnect frequency and existing memory controller QoS policy.

23. The system of claim 19, wherein an unacceptable deadline miss element comprises at least one of a processing core, a display engine, a camera controller, a graphical processing unit, a modem, and software or firmware running on a programmable computing engine.

* * * * *